Feb. 18, 1958 P. C. HOSKING 2,823,547
WHEEL SPINNER UNIT
Filed Sept. 20, 1956 2 Sheets-Sheet 1
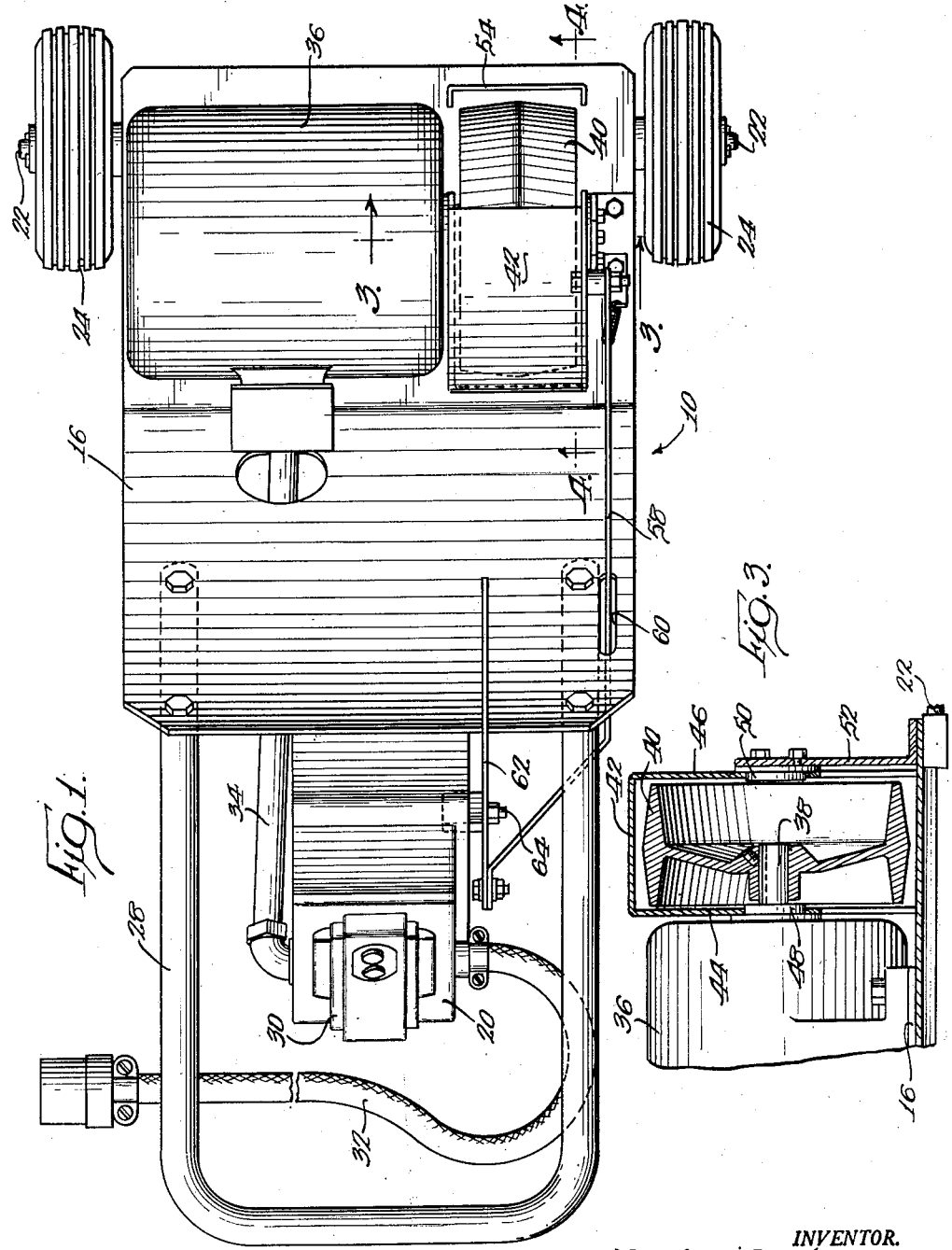
INVENTOR.
Paul C. Hosking
BY
Ahlberg, Wuppet & Gradolph
Atty:

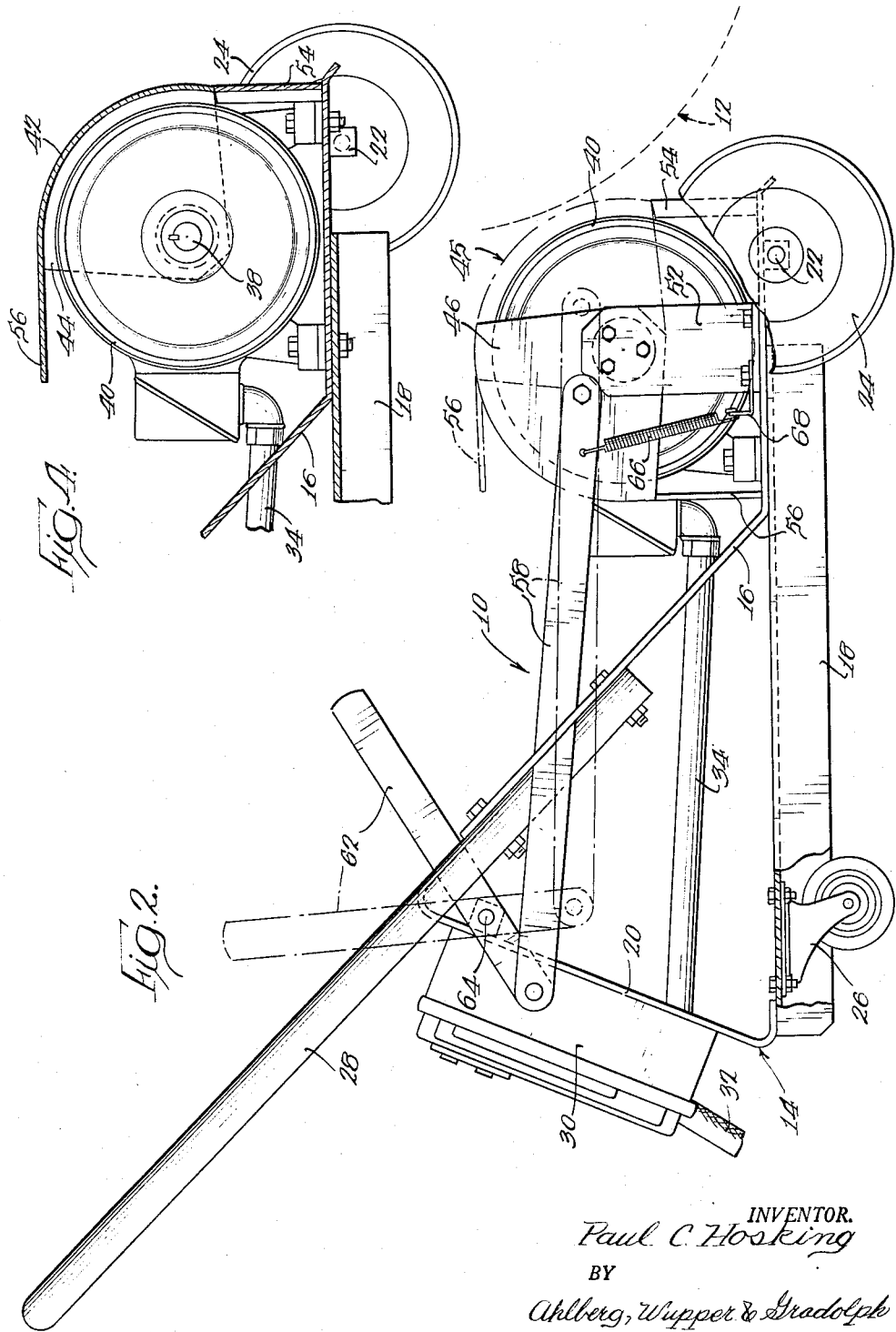

United States Patent Office 2,823,547
Patented Feb. 18, 1958

2,823,547

WHEEL SPINNER UNIT

Paul C. Hosking, Wilmette, Ill., assignor to Stewart-Warner Corporation, Chicago, Ill., a corporation of Virginia Application September 20, 1956, Serial No. 611,033

7 Claims. (Cl. 74—16)

The present invention relates to the rotation of a vehicle support wheel to determine any unbalanced condition of the wheel while it is mounted in a normal manner on the vehicle, which is elevated to suspend the wheel during an unbalance determining operation. Due to the large rotary moments of inertia characteristic of automotive vehicle support wheels, particularly the massive wheels used on heavy trucks and buses, the acceleration of such wheels to unbalance determining speeds requires a proportionately large amount of energy. Moreover, the kinetic energy imparted to a suspended wheel in bringing it up to unbalance determining speed must be dissipated upon completion of the unbalance determining operation.

One object of the invention is to provide, for quickly accelerating and decelerating a mounted vehicle support wheel, a portable spinner unit of improved construction which affords exceptional operating ease and efficiency in applying extremely powerful accelerating and decelerating forces to the wheel.

A more specific object is to provide a portable spinner unit of the character recited, which utilizes substantially the same positional relationship of the unit to a suspended vehicle support wheel to apply either a powerful accelerating or decelerating force to the wheel. A related object is to enable the operator of the improved spinner unit to precondition the unit to apply either a wheel accelerating or decelerating force while remaining in position to move the unit into and out of effective engagement with a vehicle wheel.

Another object is to provide an improved spinner unit of the above character, which affords an exceptionally high order of inherent safety in operation while at the same time sharply minimizing the size and cost of the spinner structure required to produce high wheel accelerating power.

Other objects and advantages will become apparent from the following description of the exemplary form of the invention illustrated in the drawings, in which Fig. 1 is a plan view of a portable spinner unit incorporating the invention;

Fig. 2 is a side elevational view of the spinner unit, illustrating in phantom one of two working positions of shiftable parts which condition the unit for wheel acceleration or deceleration;

Fig. 3 is a fragmentary sectional view, taken along the line 3—3 of Fig. 1; and

Fig. 4 is a fragmentary sectional view, taken along the line 4—4 of Fig. 1.

As shown in the drawings, the present invention is incorporated into a portable dolly or spinner unit 10 which is moved manually into and out of engagement with a vehicle support wheel 12 (illustrated in phantom in Fig. 2), mounted on a vehicle (not shown) which is used to support the wheel temporarily during an unbalance determining operation. Means suitable for supporting the vehicle and determining any unbalance in the suspended wheel 12 while it is rotating are well known in the art and need not be described here.

As will presently appear, the spinner unit 10 is designed to apply either high accelerating or decelerating power to the suspended wheel 12. The large inertia which is characteristic of automotive vehicle wheels, particularly those used on trucks and buses, necessarily has a strong reaction on the spinner unit as the latter is used to accelerate or decelerate the wheels rapidly. This reaction of a vehicle wheel on the spinner unit is sustained by a longitudinal support frame 14 in the unit, which cushions the engagement of the unit with the wheel for maximum effectiveness in transmitting rotative force between the two.

The spinner unit frame 14 is basically a welded assembly of three simple parts, a rectangular base plate 16, a longitudinal channel 18 (Fig. 2), and a rear connecting bracket 20. Fashioned from a single rectangular blank of flat metal stock, the connecting bracket 20 located at the rear end of the frame 14 is inclined upwardly and forwardly at a steep angle. The lower end of the bracket is turned forwardly and welded to the rear end of longitudinal channel 18 which extends horizontally in the forward direction. The upper end of the bracket 20 is turned forwardly and downwardly and welded to one end of the base plate 16. The base plate 16 has a width approximately three times that of the bracket 20, which is substantially equal in width to the channel 18.

From the bracket 20, the rectangular plate 16 extends forwardly and downwardly at an angle of approximately 45° to the upper surface of the longitudinal channel 18 at which the plate is bent sharply to extend horizontally to a forward edge projecting a very substantial distance beyond the forward end of the channel 18, as shown in Figs. 2 and 4.

The portion of the base plate 16 projecting beyond the channel 18 provides a firm, yet somewhat yieldable, connection between the main portion of the frame 14 and two stub axles 22 welded to the underside of the base plate between its extreme forward edge and the channel 18. As shown in Fig. 1, the two stub axles 22 cantilever beyond opposite sides of the plate 16 to journal two dolly support wheels 24 of substantial size.

The rear end of the frame 14 is supported by a caster 26 attached to the underside of the channel 18 adjacent the bracket 20.

As will presently appear, the upwardly sloping bracket 20 and the upwardly sloping rear end of the base plate 16 form extremely convenient support for manual controls and operating handles for the spinner unit, which may be grouped together for utmost convenience in use. Thus, the two ends of a U-shaped dolly handle 28 are bolted to the underside of the upper end of the base plate 16 along opposite marginal edges of the plate, as shown in Figs. 1 and 2. From the plate 16 the handle 28 continues upwardly to a height most convenient to be grasped by the operator standing at the rear of the unit.

A manually operated electric motor control 30 is attached to the sloping rear surface of the bracket 20 for convenient operation by a user positioned at the rear of the unit. Electric power is supplied to the control 30 through a suitable lead 32.

Electric power from the control 30 is supplied through a conduit 34 to a powerful spinner motor 36 mounted on the horizontal portion of the base 16 to have an axis of rotation parallel to the support wheel axles 22.

The motor 36 is placed on the base plate 16 to provide space above the plate at one end of the motor for the accommodation of vehicle wheel accelerating and decelerating structure including a drive shaft 38 (Figs. 3 and 4) projecting from the motor. The projecting drive shaft 38 is keyed to a crowned spinner wheel 40 of substantial diameter.

Normally, the periphery of the spinner wheel 40 is covered from above by a combined spinner wheel shield and brake element 42 shiftable between an operative spinner wheel shielding position and an inoperative position which exposes the periphery of the spinner wheel 40 in a spinning or wheel contact zone 45 (Fig. 2) located forwardly and upwardly from the axis of the wheel.

Preferably, the element 42 is formed from a piece of sheet metal having a width sufficient to span the periphery of the spinner wheel 40 along the axis of the wheel. The element is curved in an approximately 90° arc with a radius of curvature somewhat greater than the radius of the spinner wheel. The two curving edges of the element 42 are welded respectively to the edges of a pair of sheet metal support plates 44, 46, which are shaped generally as right-angled sectors of a circle, having a radius substantially larger than that of the wheel 40.

As shown in Fig. 3, the apex of the support sector 44 is apertured to receive a support journal 48 located on the case of the motor 36 in surrounding relation to the projecting drive shaft 38. Similarly, the apex of the support sector 46 is apertured to receive a support journal 50 concentric with the journal 48. The journal 50 is attached to the upper end of an upright support bracket 52 mounted on the base plate 16 at the outer end of the channel 18.

Normally, the element 42 in pivoted forwardly (clockwise as viewed in Figs. 2 and 4) to an operative position (Fig. 4) in which the element covers the periphery of the wheel 40 in the spinning zone 45. In this position, the element 42 is held against further swinging movement in a forward and downward direction by engagement of the lower forward edge of the element and the adjacent portions of its support plates 44, 46 with the upper end of an abutment stop 54. Preferably, the stop 54 is formed by a short length of channel stock supported in a vertical position by the forward edge of the base plate 16 which projects beyond the channel 18.

To expose the periphery of the wheel 40 in the spinning zone 45, the element 42 is swung rearwardly (counterclockwise as viewed in Figs. 2 and 4) through an angle of approximately 90°. As shown in Fig. 2, this rearward swinging movement of the element 42 is limited to the desired maximum angle by engagement of a limit stop 56 on the element with the underlying base plate 16. The limit stop 56 is essentially an integral continuation of the counterclockwise end of the element 42 in a straight line to a length which is proper for terminating rearward swinging movement of the element in the desired retracted position.

The brake element 42 is shifted between its operative and retracted positions by an operator standing at the rear end of the spinner unit near the dolly handle 28. For this purpose, an operating link 58 is pivotally connected to the swingable support sector 46 and extended rearwardly through a slot 60 (Fig. 1) in the upwardly inclined portion of the plate 16. The rear end of the link 58 is bent laterally inwardly and pivotally connected to the lower end of an operating lever 62, which is swingably supported on a pivot 64 welded to the upper end of the bracket 20. From the pivot 64 the handle 62 projects upwardly above the upper end of the plate 16 for convenient operation by a person standing at the rear of the unit as mentioned.

The element 42 is yieldably retained in either its operative or retracted position by an overcenter tension spring 66 (Fig. 2), connected between the link 58 adjacent the support sector 46 and an anchor lug 68 at the lower end of the bracket 52.

Use of the portable spinner unit thus provided is greatly facilitated by the fact that substantially the same positional relationship of the spinner unit to a vehicle support wheel 12 is utilized for applying both a rotative accelerating force and a decelerating or braking force to the wheel. Using the handle 28 the operator moves the unit to carry the spinner wheel 40 into adjacent alignment with the tread of a suspended vehicle wheel 12. The spinner motor 36 is started by actuation of the control 30 and allowed to run normally until the motor has had time to cool after the last wheel spinning operation.

The combined spinner wheel shield and brake element 42 is left in operative position (Fig. 4) until just before the unit is used to apply an accelerating force to the adjacent vehicle wheel 12. Then the operator moves the handle 62 forwardly from the position illustrated in phantom in Fig. 2, to the position shown in solid lines, thus retracting the brake element 42 to expose the spinning wheel 40 in the spinning zone 45. While shifting the handle 62 from one position to another in this manner, the operator remains in position, adjacent the handle 28, to move the unit forwardly to engage the spinning wheel 40 with the tread of the vehicle wheel 12. The high power of the motor 36 (which may have, for example, a power output of 5 H. P.) is applied rapidly to accelerate the adjacent wheel 12 to unbalance determining speed even though the wheel may be of massive size and weight.

When the vehicle wheel undergoing acceleration has reached the desired speed, the operator retracts the spinner unit a short distance from the wheel and immediately shifts the handle 62 back to the position illustrated in phantom in Fig. 2. The ease with which the user may operate the handle 62 from the same position from which operating force is applied to the handle 28 avoids any element of inconvenience which might otherwise be associated with this safety measure. Thus, the spinning wheel 40, which continues to rotate to allow cooling of the motor 36, is immediately shielded as a protective measure.

Moreover, shifting of the handle 62 back to the position indicated in phantom in Fig. 2, conditions the spinner unit to apply a powerful decelerating or braking force to the rotating wheel 12 quickly to dissipate the very substantial kinetic energy which it has acquired during acceleration. To brake the wheel to a stop, the operator has merely to push the spinner unit forward to engage the brake element 42 with the tread of the rotating wheel 12.

After braking the wheel to a stop, the spinner unit remains in position laterally to reapply accelerating power to the wheel again to bring it up to unbalance determining speed for the purpose of rechecking the condition of balance, usually after the application of one or more weights. In this manner a wheel may be accelerated and decelerated as many times as desired with great ease and convenience.

As previously intimated, the firm, yet somewhat resilient, construction of the base 16 as it projects forwardly beyond the channel 18 to support the stop 54, cushions the reaction of the rotating wheel 12 on the brake element 42 during a braking operation to facilitate a smooth, highly efficient action of the spinner unit on the wheel.

The protection afforded to personnel from the rotating wheel 40 permits safe operation of the motor 36 to reduce its temperature, between successive applications of the unit to accelerate an adjacent vehicle wheel. This feature permits a sharp minimization in the size and weight of the motor required to provide high wheel accelerating power.

While I have shown and described a preferred embodiment of my invention, it will be apparent that numerous variations and modifications thereof may be made without departing from the underlying principles of the invention. I therefore desire, by the following claims, to

I claim:

1. A portable vehicle wheel spinner unit comprising, in combination, frame means, support wheels on said frame means, a spinner wheel, mounting means supporting said spinner wheel rotatably on said frame means to locate on upwardly curving portion of the periphery of the wheel in a vehicle wheel contact zone disposed upwardly and outwardly from the axis of said spinner wheel, a wheel spinning motor supported on said frame means and drivingly connected to said spinner wheel to rotate the latter in a predetermined direction, a handle on said frame means for moving the latter on said support wheels therefor, a vehicle wheel brake member, support means movably supporting said brake member for movement between a retracted position exposing the periphery of said spinner wheel in said contact zone and an operative position disposed in said contact zone in covering relation to the adjacent periphery of said spinner wheel, and abutment means on said frame means positioned to coact with said brake member when the latter is in said operative position to preclude movement of the brake member in the direction of rotary movement of the adjacent portion of said spinner wheel periphery.

2. A portable vehicle wheel spinner unit comprising, in combination, frame means, rotary support means extending downwardly from said frame means to provide movable support to the latter, handle means on said frame means for moving the latter on said support means, a spinner wheel, means supporting said spinner wheel rotatably on said frame means to dispose an upwardly curving portion of the periphery of said wheel in a vehicle wheel contact zone located upwardly and outwardly with respect to the axis of the spinner wheel, a motor mounted on said frame means and connected in driving relation to said spinner wheel, a combined spinner wheel shield and vehicle wheel brake element, and support means movably supporting said shield and brake element on said frame means for movement between an operative position disposed in said contact zone in covering relation to the adjacent periphery of said spinner wheel and a retracted position exposing said spinner wheel periphery in said contact zone.

3. A portable vehicle wheel spinner unit comprising, in combination, frame means, support wheels on said frame means, a handle on said frame means extending rearwardly therefrom for use in moving said frame means on said support wheels therefor, a spinner wheel, means mounting said spinner wheel rotatably on said frame means to locate a portion of the periphery of the wheel in a vehicle wheel contact zone disposed upwardly and forwardly from the axis of the wheel, a driving motor mounted on said frame means and drivingly connected to said spinner wheel, a vehicle wheel brake member, support means movably supporting said brake member for movement between a retracted position exposing the periphery of said wheel in said contact zone and an operative position in said contact zone covering the adjacent portion of the wheel periphery, and manual shifting means connected to said brake member and extending rearwardly for convenient actuation from the rear of said frame means to shift said vehicle brake member from one of said positions to the other.

4. A portable vehicle wheel spinner unit comprising, in combination, frame means, support wheels on said frame means, a handle on said frame means for moving the latter on said wheels, a spinner wheel rotatably mounted on said frame means to locate a portion of the periphery thereof in a wheel contact zone displaced horizontally and upwardly from the axis of the wheel, a movable brake member pivotally supported on said frame means for pivoting about an axis adjacent and generally parallel to the axis of said spinner wheel to swing between an inoperative position exposing said wheel periphery in said contact zone and an operative position in said contact zone covering the adjacent periphery of the wheel, and a shifting linkage interconnected with said brake member and extending toward said handle for convenient operation to move said brake member from one of said positions to the other.

5. A portable vehicle wheel spinner unit comprising, in combination, frame means, support wheels on said frame means, a handle on said frame means extending rearwardly therefrom for moving said frame means on said wheels therefor, a rotary spinner wheel disposed on the forward portion of said frame means, a driving motor on said frame means drivingly connected to said spinner wheel for rotating the latter in a predetermined direction, a pair of brake support members pivotally mounted on opposite sides of said spinner wheel for swinging movement about an axis generally concentric with the rotary axis of said wheel; an arcuate brake member supported on and spanning the radially outward extremities of said support members in radially spaced covering relation to the adjacent arcuate portion of the periphery of said spinner wheel; an operating linkage interconnected with one of said support members and extending rearwardly toward said handle for convenient operation to shift said arcuate brake member between an operative position covering the peripheral portion of said wheel disposed upwardly and forwardly from the axis of said wheel and an inoperative position which exposes said last mentioned peripheral portion of said wheel, and stop means on said frame means positioned for coaction with said arcuate brake member when the latter is in said operative position to preclude pivotal movement of the latter in said predetermined direction of rotation of said spinner wheel.

6. A portable vehicle wheel spinner comprising, in combination, horizontally extending frame structure having forward and rear ends, support means extending downwardly from said frame structure to provide movable support to the rear end thereof, a base plate secured to said frame structure and projecting forwardly therefrom for a substantial distance, support wheels, means journaling said wheels on said base plate some distance forward of said frame structure, a motor mounted on said base plate, a spinner wheel, means connecting said wheel for rotation in a predetermined direction by said motor and supporting the wheel rotatably at the forward end of said base to dispose a portion of the periphery of the wheel in a vehicle wheel contact zone located forwardly and upwardly from the axis of the wheel, a spinner wheel shield and brake element, means movably supporting said element for movement between a retracted position exposing the wheel periphery in said contact zone and an operative position in said contact zone covering the adjacent periphery of the wheel, and abutment means mounted on said base plate forward of said frame structure and positioned for engagement with said shield and brake element when the latter is in said operative position to preclude movement of the element in said predetermined direction of rotation of the adjacent wheel periphery.

7. A portable vehicle wheel spinner comprising, in combination, a horizontally extending frame having forward and rear ends, support wheels on said frame; said frame including a longitudinal frame element, a bracket member extending upwardly from the rear end of said frame element, and a base plate inclined forwardly and downwardly to said frame element from the upper end of said bracket and extending forwardly beyond said frame element; a motor mounted on said base plate, a spinner wheel, means connecting said wheel for rotation in a predetermined direction by said motor and supporting the wheel rotatably at the forward end of said base to dispose a portion of the periphery of the wheel in a vehicle wheel contact zone located forwardly and upwardly from the axis of the wheel, a spinner wheel shield and brake element, means movably supporting said element for movement between a retracted position exposing the wheel periphery in said contact zone and an operative position in said contact zone covering the adjacent periphery of the wheel, abutment means mounted on said base plate forward of said longitudinal frame element and positioned for engagement with said shield and brake element when the latter is in said operative position to preclude movement of the element in said predetermined direction of rotation of the adjacent wheel periphery, a control connected to shift said shield and brake element between said positions therefor and extending to an operating position at the rear of said frame, a dolly handle mounted on the upper rear portion of said frame, and a motor control mounted on the rear end of said frame and connected electrically with said motor.

No references cited.